United States Patent
Lu et al.

(10) Patent No.: US 10,621,701 B2
(45) Date of Patent: Apr. 14, 2020

(54) BACKGROUND SUPPRESSION METHOD AND DETECTING DEVICE IN AUTOMATIC OPTICAL DETECTION OF DISPLAY PANEL

(71) Applicant: WUHAN JINGCE ELECTRONIC GROUP CO., LTD., Hubei (CN)

(72) Inventors: Fangbo Lu, Hubei (CN); Feng Yao, Hubei (CN); Biaohua Deng, Hubei (CN); Kai Chen, Hubei (CN); Yafei Shen, Hubei (CN)

(73) Assignee: WUHAN JINGCE ELECTRONIC GROUP CO., LTD., Hubei (CN)

( * ) Notice: Subject to any disclaimer, the term of this patent is extended or adjusted under 35 U.S.C. 154(b) by 0 days.

(21) Appl. No.: 16/342,964

(22) PCT Filed: Mar. 23, 2017

(86) PCT No.: PCT/CN2017/077817
§ 371 (c)(1),
(2) Date: Apr. 17, 2019

(87) PCT Pub. No.: WO2018/086289
PCT Pub. Date: May 17, 2018

(65) Prior Publication Data
US 2020/0058102 A1    Feb. 20, 2020

(30) Foreign Application Priority Data
Nov. 10, 2016   (CN) .......................... 2016 1 0990996

(51) Int. Cl.
*G06T 5/00* (2006.01)
*G06T 5/20* (2006.01)
(Continued)

(52) U.S. Cl.
CPC .............. *G06T 5/002* (2013.01); *G06T 5/009* (2013.01); *G06T 5/20* (2013.01); *G06T 5/40* (2013.01);
(Continued)

(58) Field of Classification Search
CPC .......... G06K 2209/057; G06K 9/00369; G06T 11/60; G06T 2207/10121;
(Continued)

(56) References Cited

U.S. PATENT DOCUMENTS

2015/0282890 A1* 10/2015 Cohen ................... A61B 6/481
600/424

FOREIGN PATENT DOCUMENTS

CN    103913858    7/2014

OTHER PUBLICATIONS

Liu Xing-Miao, et al., "A Nonlinear Algorithm of Infrared Image Enhancement Based on Wavelet Transform," Infrared Technology, vol. 31, Dec. 2009, pp. 708-711.

* cited by examiner

*Primary Examiner* — Manuchehr Rahmjoo
(74) *Attorney, Agent, or Firm* — JCIPRNET

(57) ABSTRACT

The disclosure provides a background suppression method and a detecting device in automatic optical detection for a display panel, wherein the background suppression method includes the following steps: S1: collecting a pure color image of the display panel; S2: performing multi-level wavelet decomposition on the pure color image to obtain a series of high-frequency sub-bands and low-frequency sub-bands; S3: performing coefficient smoothing process on high-frequency sub-bands in multiple directions of each level, and performing contrast enhancement process on each level of low-frequency sub-bands; S4: the processed high- (Continued)

frequency sub-bands and the processed low-frequency sub-bands are subjected to wavelet reconstruction to obtain a defect image after background suppression. The disclosure performs multi-scale and multi-resolution decomposition on the image, and performs texture suppression and image enhancement on the decomposed high-frequency sub-bands and low-frequency sub-bands respectively, and can maintain the contrast of the original defect while suppressing the background texture.

14 Claims, 3 Drawing Sheets

(51) Int. Cl.
  *G06T 7/00* (2017.01)
  *G06T 5/40* (2006.01)
(52) U.S. Cl.
  CPC .. *G06T 7/0004* (2013.01); *G06T 2207/10024* (2013.01); *G06T 2207/30108* (2013.01)
(58) Field of Classification Search
  CPC . G06T 2207/30048; G06T 2207/30101; G06T 5/001; G06T 7/0012; G06T 7/0014; G06T 7/13; G06T 7/246; G06T 7/62; G06T 2207/10016; G06T 2207/30172; G06T 5/003; G06T 7/12; A61M 25/09
  See application file for complete search history.

Partial enlargement view

Partial enlargement view

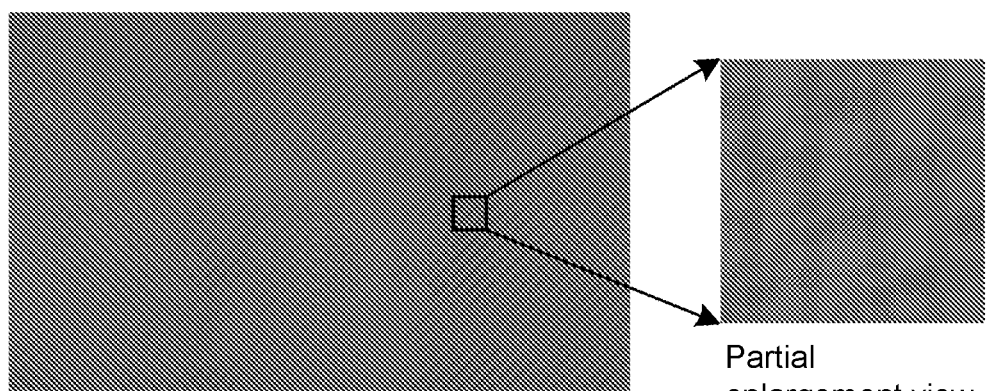
FIG.4(a) Partial enlargement view
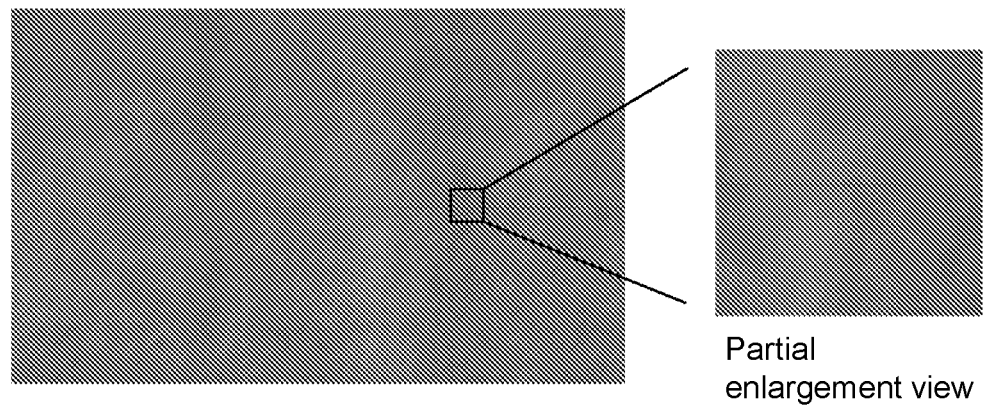
FIG.4(b) Partial enlargement view

BACKGROUND SUPPRESSION METHOD AND DETECTING DEVICE IN AUTOMATIC OPTICAL DETECTION OF DISPLAY PANEL

CROSS-REFERENCE TO RELATED APPLICATION

This application is a 371 application of an international PCT application serial no. PCT/CN2017/077817, filed on Mar. 23, 2017, which claims priority to and the benefit of China Patent Application No. CN201610990996.4, filed on Nov. 10, 2016. The entirety of each of the above-mentioned patent applications is hereby incorporated by reference herein and made a part of this specification.

BACKGROUND OF THE DISCLOSURE

Field of the Disclosure

The disclosure belongs to the technical field of automatic optical defect detection, and more specifically to a background suppression method and a detecting device in automatic optical detection of a display panel.

Description of Related Art

New type of display panels such as TFT-LCD (Thin Film Transistor Liquid Crystal Display) has become the mainstream display device due to its characteristics of low power consumption, high definition and low radiation, it plays an irreplaceable role in the two-dimensional and three-dimensional information transmitting process.

The production process of new type of display panels such as TFT-LCD is very complicated, and therefore various display defects are inevitably generated in the actual preparation process, among which Mura defects are the most difficult to detect. There are many shortcomings in the conventional detecting method relying on human eyes, and such method has the problems of high cost, instability, and low efficiency. In recent years, machine vision defect detecting methods have received great attention due to the characteristics of high degree of automation and robustness.

The Mura defect has low contrast and blurred borders. Moreover, due to the physical structure of the display panel, the defect image collected by a high-definition device such as a CCD camera generates regularly arranged textured background information mutually perpendicular to each other, which is usually integrated with Mura defect, increasing the difficulty of machine vision detection. Suppressing textured background without affecting the original feature of Mura defect is the key to successfully detecting Mura defect.

In a patent document (entitled: A FILTERING METHOD IN AUTOMATIC OPTICAL DETECTION OF A DISPLAY PANEL, Publication Number CN201310004940.3), the textured background is suppressed by using a Gabor filter method. The method regards the uniformly distributed textured background as noise and filters it through filtering process. The image is subjected to multiple frequencies and multiple directions of filter convolution, thereby filtering the textured background in all directions, thus achieving the purpose of enhancing defects. However, this method also reduces the contrast of Mura defect while removing the uneven background, which significantly affects the segmentation and judgment in classification of defects in post-processing of image.

SUMMARY OF THE DISCLOSURE

To solve the defects of the prior art, the purpose of the present disclosure is to provide a background suppression method and a detecting device in automatic optical detection of a display panel, which aim to solve the technical problem of poor texture suppression results from the prior art which reduces contrast of defect while suppressing background.

The disclosure provides a background suppression method in automatic optical detection of a display panel, including the following steps.

S1: collecting an image of the display panel.

S2: performing multi-level wavelet decomposition on the image to obtain a series of high-frequency sub-bands and low-frequency sub-bands.

S3: performing coefficient smoothing process on the high-frequency sub-bands in multiple directions of each level, and performing contrast enhancement process on each level of low-frequency sub-bands.

S4: performing wavelet reconstruction on the processed high-frequency sub-bands and the processed low-frequency sub-bands to obtain a defect image after background suppression.

Further, the image is a pure color image.

Further, the pure color image is a pure white image, or a pure gray image, or a pure red image, or a pure green image, or a pure blue image.

Further, after step S1 and before step S2, the method further includes the steps of:

obtaining a wavelet decomposition level J; wherein the wavelet decomposition level $J=\text{ceil}(\log_2(TW+TH))$ or $J=\text{ceil}(\log_2((TW+TH)/2))$, TW is the period of the horizontal texture of the touch-screen image, TH is the period of the vertical texture, and ceil is the smallest integer greater than or equal to a certain number.

Further, in step S2, $3*J+1$ high-frequency sub-bands and low-frequency sub-bands are obtained after performing the J-level wavelet decomposition on the image. The high-frequency sub-band includes: a horizontal sub-band H, a vertical sub-band V, and a diagonal sub-band D. The low-frequency sub-band includes: an approximate sub-band A, wherein the j-th level wavelet sub-band is $A_{k_1 k_2}^{(j)} = \langle f(x_1, x_2), \phi_{jk_1}(x_1)\phi_{jk_2}(x_2) \rangle$, $H_{k_1 k_2}^{(j)} = \langle f(x_1, x_2), \phi_{jk_1}(x_1)\psi_{jk_2}(x_2) \rangle$, $V_{k_1 k_2}^{(j)} = \langle f(x_1, x_2), \psi_{jk_1}(x_1)\phi_{jk_2}(x_2) \rangle$, $D_{k_1 k_2}^{(j)} = \langle f(x_1, x_2), \psi_{jk_1}(x_1)\psi_{jk_2}(x_2) \rangle$, wherein $\phi$ and $\psi$ are scale function and wavelet function respectively, f is a wavelet approximation sub-band of j−1 level, and approximate sub-band is also called low-frequency sub-band. $A_{k_1 k_2}^{(j)}$, $H_{k_1 k_2}^{(j)}$, $V_{k_1 k_2}^{(j)}$, $D_{k_1 k_2}^{(j)}$ are the approximate sub-band, horizontal sub-band, vertical sub-band and diagonal sub-band of the j-th level wavelet decomposition, respectively, wherein $j=1, 2, \ldots, J$.

Further, in step S3, the high-frequency sub-band is subjected to coefficient smoothing process by using Gaussian low-pass filtering, wherein the high-frequency sub-bands of different levels adopt different Gaussian filtering kernel parameters, and the Gaussian filtering kernel parameters are: $\text{sizeW}^{(j)}=(\text{imgW}/200)/2^j$, $\text{sizeH}^{(j)}=(\text{imgH}/200)/2^j$, sigma $W^{(j)}=TW$, sigma$H^{(j)}=TH$, $j=1 \ldots J$.

Specifically, imgW and imgH are the width and height of the original image. $\text{sizeW}^{(j)}$ and $\text{sizeH}^{(j)}$ are the width and height parameters of the Gaussian filter kernel corresponding to the j-th level wavelet sub-band. sigma$W^{(j)}$ and sigma$H^{(j)}$ are the standard deviation parameter in the horizontal and vertical directions of the Gaussian filter kernel corresponding to the j-th level wavelet sub-band.

Further, Gaussian low-pass filtered images $\tilde{F}_{k_1 k_2}^{(j)} = F_{k_1 k_2}^{(j)}$ ** Gaussian$^{(j)}$ are used.

Specifically, $$Gaussian^{(j)} = \frac{1}{2\pi * sigmaW^{(j)} * sigmaH^{(j)}} e^{-\left(\frac{x^2}{2*(sigmaW(j))^2} + \frac{y^2}{2*(sigmaH(j))^2}\right)},$$

Gaussian$^{(j)}$ is a Gaussian low-pass filter corresponding to the j-th level wavelet sub-band, and ** is a filter convolution operation.

Further, in step S3, the contrast enhancement process is performed on each level of the low-frequency sub-bands by using a histogram equalization method.

Further, in step S4, the defect image is:

$$f(x, y) = \frac{1}{\sqrt{MN}} \sum_m \sum_n \tilde{A}^{(j)}(j_0, m, n)\phi_{j_0, m, n}(x, y) + \frac{1}{\sqrt{MN}} \sum_{i=H,V,D} \sum_{j=j_0}^{n} \sum_m \sum_n \tilde{F}_\psi^j(j, m, n)\psi_{j, m, n}(x, y)$$

wherein $\tilde{A}^{(j)}$ is an image after the low-frequency sub-band is enhanced, $\tilde{F}$ is an image after the high-frequency sub-band coefficient is suppressed, m and n are the width and height of the j-th level wavelet sub-band image.

The disclosure further provides automatic optical detecting device for a display panel, including a light source, a camera set and an image collecting and processing unit interacting with the camera set. After the image collecting and processing unit collects the image data of the display panel, and before the defect information of the image data is retrieved, the background suppression process is further performed on the image data by using the above technical solution.

Further, the image collecting and processing unit includes the following.

A wavelet decomposition and processing module, configured to obtain a series of high-frequency sub-bands and low-frequency sub-bands by performing multi-level wavelet decomposition on the image data; and performing coefficient smoothing process on the high-frequency sub-bands in multiple directions of each level, performing contrast enhancement process on each level of low-frequency sub-bands.

A wavelet reconstruction module, configured to perform wavelet reconstruction on the processed high-frequency sub-bands and the processed low-frequency sub-bands to obtain defect image data after background suppression.

Through the above technical solutions proposed by the present disclosure, the present disclosure has the following technical advantages compared with the prior art.

(1) The present disclosure can be applied to the detection of various forms of Mura defect on the market in all specifications and sizes in the field of liquid crystal display, and has high utility.

(2) The present disclosure does not require any reference samples, and the method parameters can be adaptively adjusted, and the self-adaptation and robustness are strong.

(3) The present disclosure performs multi-scale and multi-resolution decomposition on images, and performs texture suppression and image enhancement on the decomposed high-frequency and low-frequency sub-bands respectively, and can maintain the contrast of the original defects while suppressing the background texture, thus achieving good texture suppression effect.

BRIEF DESCRIPTION OF THE DRAWINGS

FIG. 4(a) is an original image with defects of light horizontal lines.

FIG. 4(b) is an image of FIG. 4(a) after being subjected to background suppression by using the background suppression method proposed by the present disclosure.

DESCRIPTION OF EMBODIMENTS

Figure 1:
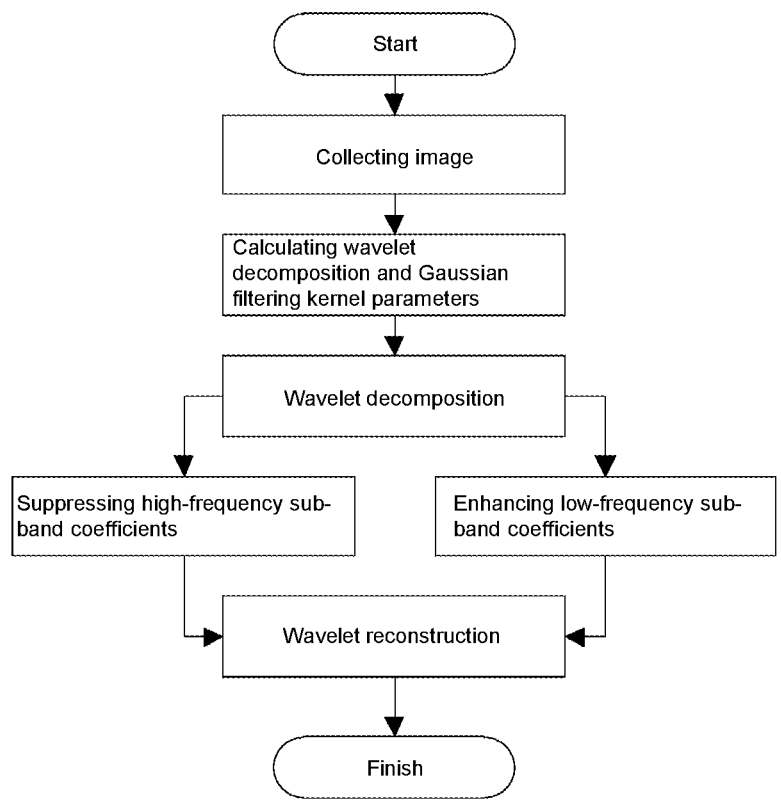
FIG. 1 is a flow chart showing an implementation of a background suppression method in automatic optical detection of a display panel proposed by the present disclosure.

To further elaborate the purpose, technical solution and advantages of the present disclosure, the present disclosure will be further described in detail below with reference to the accompanying drawings and embodiments. It should be understood that the specific embodiments described herein are merely illustrative of the disclosure and are not intended to limit the disclosure.

The disclosure provides a background suppression method in automatic optical detection of a display panel. The method performs multi-scale and multi-directional wavelet decomposition on the display panel image, and suppresses and enhances the high-frequency and low-frequency sub-bands respectively subjected to wavelet decomposition, and finally obtains the defect image after suppression of textured background through wavelet reconstruction, thereby solving the problem of conventional filtering method through which the defect contrast is reduced during suppression of the background.

Embodiments of the present disclosure provide an automatic optical detecting device for a display panel, including a light source, a camera set, and an image collecting and processing unit that interacts with the camera set. Before the image collecting and processing unit retrieves the image defect information of the display panel, a background suppression process is further performed on the collected image, and the process includes the following steps.

(1) Collecting an image (i.e., an image in a touch-screen mode) of the display panel in different touch-screen modes.

(2) Performing a multi-level wavelet decomposition on the image to obtain a series of wavelet high-frequency and low-frequency sub-bands.

(3) Performing a high-frequency wavelet coefficient suppression: Gaussian low-pass filtering method is carried out to perform coefficient smoothing on the high-frequency sub-bands in multiple directions of each level.

(4) Enhancing low-frequency sub-band coefficients: contrast enhancement is performed on each level of low-frequency sub-bands.

(5) Performing wavelet reconstruction on the high-frequency sub-band after coefficient suppression and the low-frequency sub-band after coefficient enhancement to obtain the defect image after background suppression.

In the above embodiment, the image collecting and processing unit includes a wavelet decomposition and processing module and a wavelet reconstruction module. The wavelet decomposition and processing module is configured to perform multi-level wavelet decomposition on the image data to obtain a series of high-frequency sub-bands and low-frequency sub-bands; perform coefficient smoothing process on the high-frequency sub-bands in multiple directions of each level; and perform contrast enhancement process on each level of low-frequency sub-band. The wavelet reconstruction module is configured to perform wavelet reconstruction on the processed high-frequency sub-bands and the processed low-frequency sub-bands to obtain defect image data after background suppression.

The disclosure provides a simple and efficient background suppression method for display panel, which can maintain the contrast of the original defect while suppressing the background texture, and can overcome the shortcomings of conventional filtering method or background fitting method which cannot maintain defect while suppressing background. In the meantime, multi-scale and multi-resolution processing can overcome the shortcomings of the conventional method which only performs single-scale and single resolution processing and generates a poor texture suppression effect.

Figure 3A:
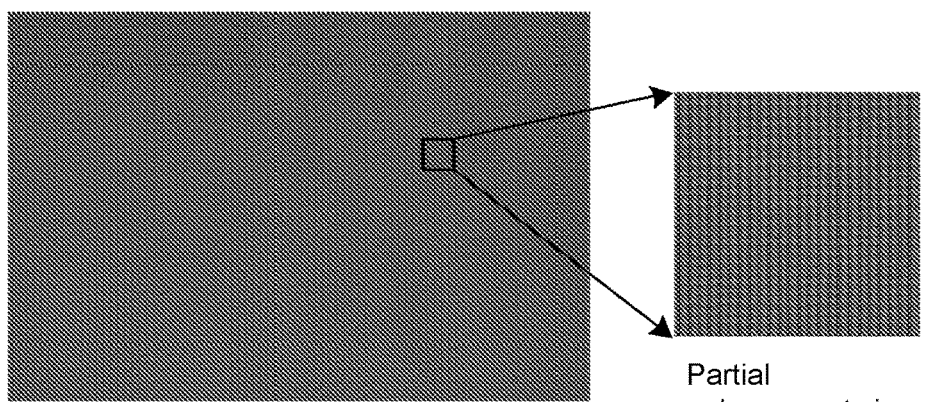
FIG. 3(a) is an original image with a drop of Mura defect.

FIG. 1 is a flow chart showing an implementation of a background suppression method in automatic optical detection of a display panel proposed by the present disclosure. The method includes the following steps:

Step S101: An image of the display panel in a touch-screen mode is collected, such as a touch-screen image in white mode, gray mode, red mode, green mode, blue mode, etc. As shown in FIG. 3(a) and FIG. 4(a), the collected touch-screen image of the display panel presents a regularly arranged textured background with a substantially constant period of the texture interval.

Step S102: The wavelet decomposition level J is calculated, the specific calculation method for the Gaussian filter kernel standard deviation parameter sigma and the filtering kernel size parameter size is as follows.

(1) The calculation of the wavelet decomposition level J: the period of the horizontal texture of the touch-screen image is set to TW, the period of the vertical texture is TH, and the period of the horizontal or vertical texture can be directly determined from the touch-screen image according to the texture period, then the wavelet decomposition level J is represented by J=ceil(log$_2$((TW+TH)/2)), where ceil is the smallest integer greater than or equal to a certain number. For example, the periods of the horizontal and vertical texture of FIG. 3(a) are 9, then the wavelet decomposition level J=4. The periods of the horizontal and vertical texture of FIG. 4(a) are 6, then the wavelet decomposition level J=3. It should be noted that the wavelet decomposition level J can also be calculated by using the formula J=ceil(log$_2$(TW+TH)).

(2) Gaussian filter kernel variance and size parameters are calculated through self-adaptive calculation method, and wavelet sub-bands of different levels can adopt different Gaussian filter kernel parameters. Specifically: sizeW$^{(j)}$=(imgW/200)/2$^j$, sizeH$^{(j)}$=(imgH/200)/2$^j$, sigmaW$^{(j)}$=TW, sigmaH$^{(j)}$=TH, j=1 . . . J.

Specifically, imgW and imgH are the width and height of the original image, sizeW$^{(j)}$ and sizeH$^{(j)}$ are the width and height parameters of the Gaussian filter kernel corresponding to the j-th level wavelet sub-band. sigmaW$^{(j)}$ and sigmaH$^{(j)}$ are the standard deviation parameter in the horizontal and vertical directions of the Gaussian filter kernel corresponding to the j-th level wavelet sub-band.

Step S103: J-level wavelet decomposition is performed on the image to obtain 3*J+1 wavelet high-frequency and low-frequency sub-bands. Each level of wavelet image is composed of four sub-bands: approximate sub-band A, horizontal sub-band H, vertical sub-band V and diagonal sub-band D after being converted by wavelet. The approximate sub-band represents the basic information of the image, reflecting the overall trend of image brightness. The three sub-bands of H, V and D represent the high-frequency information of the image, reflecting the abrupt and detailed information of the image brightness, while the image textured background usually appears as high-frequency information in the wavelet frequency domain, and is mainly distributed in the wavelet high-frequency sub- and, and the corresponding wavelet coefficient value is large. Therefore, the Gaussian low-pass filter (filter including but not limited to Gaussian low-pass filter) can be used in the wavelet high-frequency sub-band to suppress the wavelet coefficients reflecting the textured information, thus achieving the purpose of removing the textured background.

Specifically, the j-th level wavelet sub-band can be expressed as:

$$A_{k_1k_2}^{(j)}=\langle f(x_1,x_2),\phi_{jk_1}(x_1)\phi_{jk_2}(x_2)\rangle$$

$$H_{k_1k_2}^{(j)}=\langle f(x_1,x_2),\phi_{jk_1}(x_1)\psi_{jk_2}(x_2)\rangle$$

$$V_{k_1k_2}^{(j)}=\langle f(x_1,x_2),\psi_{jk_1}(x_1)\phi_{jk_2}(x_2)\rangle$$

$$D_{k_1k_2}^{(j)}=\langle f(x_1,x_2),\psi_{jk_1}(x_1)\psi_{jk_2}(x_2)\rangle$$

wherein $\Phi$ and $\psi$ are scale function and wavelet function, respectively, f is the wavelet approximate sub-band of j−1 level, and the approximate sub-band is also called low-frequency sub-band. $A_{K_1k_2}^{(j)}$, $H_{k_1k_2}^{(j)}$, $V_{k_1k_2}^{(j)}$, $D_{k_1k_2}^{(j)}$ are the approximate sub-band, horizontal sub-band, vertical sub-band and diagonal sub-band of the j-th level of wavelet decomposition, respectively, wherein j=1, 2, . . . , J.

Step S104: The high-frequency sub-band coefficient is suppressed.

Gaussian low-pass filtering is performed on the j-th level of wavelet detail sub-band $F_{k_1k_2}^{(j)}|F=H, V, D$, and the filtered image is $\tilde{F}_{k_1k_2}^{(j)}$.

$$\tilde{F}_{k_1k_2}^{(j)} = F_{k_1k_2}^{(j)} ** Gaussian^{(j)}$$

$$Gaussian^{(j)} = \frac{1}{2\pi * sigmaW^{(j)} * sigmaH^{(j)}} e^{-\left(\frac{x^2}{2*(sigmaW(j))^2}+\frac{y^2}{2*(sigmaH(j))^2}\right)}$$

wherein Gaussian$^{(j)}$ is a Gaussian low-pass filter corresponding to the j-th level wavelet sub-band, and ** is a filter convolution operation.

Step S105: The low-frequency sub-band coefficient is enhanced.

The histogram equalization enhancement is performed on the last-level of low-frequency sub-band after wavelet decomposition and the sub-band of each level after wavelet reconstruction. The image enhancement method includes but is not limited to the histogram equalization method. The wavelet low-frequency sub-band reflects the overall brightness change trend of the image. Since the Mura defect itself has a low contrast, if the direct reconstruction method is adopted, the contrast of the defect will be reduced inevitably while the texture is suppressed, and the subsequent methods for segmentation and identification of defect will be affected significantly. Enhancing the wavelet low-frequency sub-band can further improve the contrast of the image, thereby facilitating segmentation and identification of defects.

Step S106: Performing wavelet reconstruction on the high-frequency sub-band after coefficient suppression and the low-frequency sub-band after coefficient enhancement to obtain a defect image after background suppression.

$$f(x, y) = \frac{1}{\sqrt{MN}} \sum_m \sum_n \tilde{A}^{(j)}(j_0, m, n)\phi_{j_0,m,n}(x, y) +$$

$$\frac{1}{\sqrt{MN}} \sum_{i=H,V,D} \sum_{j=j_0}^{n} \sum_m \sum_n \tilde{F}_\psi^j(j, m, n)\psi_{j,m,n}(x, y)$$

wherein $\tilde{A}^{(j)}$ is an image after the low-frequency sub-band is enhanced, $\tilde{F}$ is an image after the high-frequency sub-band coefficient is suppressed, m and n are the width and height of the j-th level wavelet sub-band image, and other parameters are the same as described above.

Figure 2:
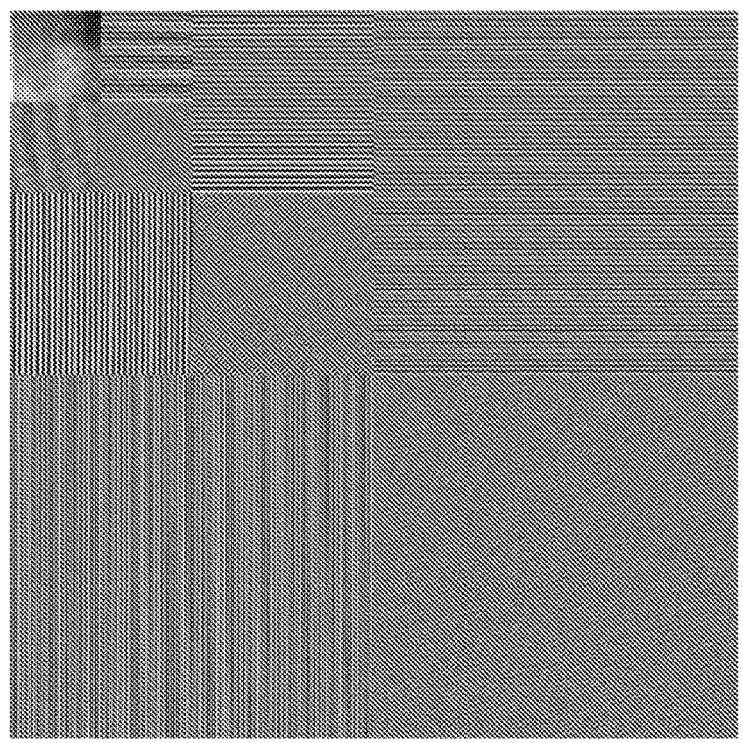
FIG. 2 is a schematic view of wavelet decomposition in a background suppression method in automatic optical detection of a display panel proposed by the present disclosure.
Figure 3B:
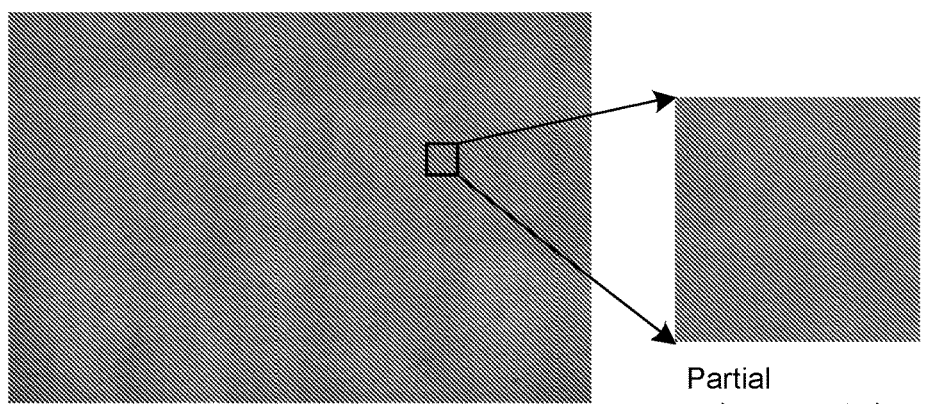
FIG. 3(b) is an image of FIG. 3(a) after being subjected to background suppression by using the background suppression method proposed by the present disclosure.

Referring to FIG. 3 and FIG. 4, it can be concluded that, through the background suppression method of the present disclosure, the image textured background is basically removed in a better way, and the defect portion is also enhanced. The schematic view of wavelet decomposition in FIG. 2 further illustrates the effectiveness of the present disclosure which utilizes multi-scale, multi-resolution and multi-directional wavelet conversion for background suppression, which can separate the background texture from the image, thereby suppressing the texture information in the high-frequency sub-band without affecting the basic information of the image in the low-frequency sub-band.

The background suppression method in the automatic optical detection of the display panel provided by the embodiment of the present disclosure can retrieve many defects such as dots, lines, Mura defects and the like from a complex textured background, and obtain an image with high defect contrast and uniform background distribution, and thus laying a good basis for automatic optical detection of display panel.

Those skilled in the art will appreciate that the above description is only a preferred embodiment of the present disclosure, and is not intended to limit the present disclosure. Any modifications, equivalent substitutions and improvements made within the spirit and scope of the present disclosure should be included in the scope of protection of the present disclosure.

What is claimed is:

1. A background suppression method in automatic optical detection of a display panel, comprising the following steps:
    S1: collecting an image of the display panel;
    S2: performing a multi-level wavelet decomposition on the image to obtain a series of high-frequency sub-bands and low-frequency sub-bands;
    S3: performing coefficient smoothing process on the high-frequency sub-bands in multiple directions of each level, and performing contrast enhancement process on each level of low-frequency sub-bands;
    S4: performing wavelet reconstruction on the processed high-frequency sub-bands and the processed low-frequency sub-bands to obtain a defect image after background suppression;
    wherein after the step S1 and before the step S2, further comprising the following steps: obtaining a wavelet decomposition level J;
    wherein the wavelet decomposition level $J=\text{ceil}(\log_2(TW+TH))$ or $J=\text{ceil}(\log_2((TW+TH)/2))$, TW is a period of a horizontal texture of the image, TH is a period of a vertical texture, and ceil is a smallest integer greater than or equal to a certain number.

2. The background suppression method according to claim 1, wherein the image is a pure color image.

3. The background suppression method according to claim 2, wherein the pure color image is a pure white image, or a pure gray image, or a pure red image, or a pure green image, or a pure blue image.

4. The background suppression method according to claim 3, wherein in the step S3, the high-frequency sub-bands are subjected to coefficient smoothing process by using a Gaussian low-pass filtering method, wherein different levels of the high-frequency sub-bands adopt different Gaussian filter kernel parameters, and the Gaussian filter kernel parameters are: $sizeW^{(j)}=(imgW/200)/2^j$, $sizeH^{(j)}=(imgH/200)/2^j$, $sigmaW^{(j)}=TW$, $sigmaH^{(j)}=TH$, j=1 . . . J; imgW and imgH are a width and a height of the original image, $sizeW^{(j)}$ and $sizeH^{(j)}$ are width and height parameters of the Gaussian filter kernel corresponding to the j-th level wavelet sub-band, $sigmaW^{(j)}$ and $sigmaH^{(j)}$ are standard deviation parameters in the horizontal and vertical directions of the Gaussian filter kernel corresponding to the j-th level wavelet sub-band.

5. The background suppression method according to claim 3, wherein in the step S3, contrast enhancement process is performed on each level of the low-frequency sub-bands by using a histogram equalization method.

6. The background suppression method according to claim 2, wherein in the step S3, the high-frequency sub-bands are subjected to coefficient smoothing process by using a Gaussian low-pass filtering method, wherein different levels of the high-frequency sub-bands adopt different Gaussian filter kernel parameters, and the Gaussian filter kernel parameters are: $sizeW^{(j)}=(imgW/200)/2^j$, $sizeH^{(j)}=(imgH/200)/2^j$, $sigmaW^{(j)}=TW$, $sigmaH^{(j)}=TH$, j=1 . . . J; imgW and imgH are a width and a height of the original image, $sizeW^{(j)}$ and $sizeH^{(j)}$ are width and height parameters of the Gaussian filter kernel corresponding to the j-th level wavelet sub-band, $sigmaW^{(j)}$ and $sigmaH^{(j)}$ are standard deviation parameters in the horizontal and vertical directions of the Gaussian filter kernel corresponding to the j-th level wavelet sub-band.

7. The background suppression method according to claim 2, wherein in the step S3, contrast enhancement process is performed on each level of the low-frequency sub-bands by using a histogram equalization method.

8. The background suppression method according to claim 1, wherein in the step S2, the image is subjected to a J-level wavelet decomposition to obtain a total of 3*J+1 high-frequency sub-bands and low-frequency sub-bands;
    the high-frequency sub-bands comprising: a horizontal sub-band H, a vertical sub-band V and a diagonal sub-band D, and the low-frequency sub-bands comprising: an approximate sub-band A, wherein the j-th level wavelet sub-band is:

$$A_{k_1 k_2}^{(j)} = \langle f(x_1, x_2), \phi_{jk_1}(x_1)\phi_{jk_2}(x_2) \rangle$$

$$H_{k_1 k_2}^{(j)} = \langle f(x_1, x_2), \phi_{jk_1}(x_1)\psi_{jk_2}(x_2) \rangle$$

$$V_{k_1 k_2}^{(j)} = \langle f(x_1, x_2), \psi_{jk_1}(x_1)\phi_{jk_2}(x_2) \rangle$$

$$D_{k_1 k_2}^{(j)} = \langle f(x_1, x_2), \psi_{jk_1}(x_1)\psi_{jk_2}(x_2) \rangle$$

wherein $\Phi$ and $\psi$ are scale function and wavelet function, respectively, f is the wavelet approximate sub-band of j-1 level, and the approximate sub-band is also called as a low-frequency sub-band, $A_{k_1k_2}^{(j)}$, $H_{k_1k_2}^{(j)}$, $V_{k_1k_2}^{(j)}$, $D_{k_1k_2}^{(j)}$ are the approximate sub-band, the horizontal sub-band, the vertical sub-band and the diagonal sub-band of the j-th level wavelet decomposition, respectively, wherein j=1, 2, J.

9. The background suppression method according to claim 8, wherein in the step S3, the high-frequency sub-bands are subjected to coefficient smoothing process by using a Gaussian low-pass filtering method, wherein different levels of the high-frequency sub-bands adopt different Gaussian filter kernel parameters, and the Gaussian filter kernel parameters are: sizeW$^{(j)}$=(imgW/200)/2$^j$, sizeH$^{(j)}$=(imgH/200)/2$^j$, sigmaW$^{(j)}$=TW, sigmaH$^{(j)}$=TH, j=1 . . . J; imgW and imgH are a width and a height of the original image, sizeW$^{(j)}$ and sizeH$^{(j)}$ are width and height parameters of the Gaussian filter kernel corresponding to the j-th level wavelet sub-band, sigmaW$^{(j)}$ and sigmaH$^{(j)}$ are standard deviation parameters in the horizontal and vertical directions of the Gaussian filter kernel corresponding to the j-th level wavelet sub-band.

10. The background suppression method according to claim 8, wherein in the step S3, contrast enhancement process is performed on each level of the low-frequency sub-bands by using a histogram equalization method.

11. The background suppression method according to claim 1, wherein in the step S3, the high-frequency sub-bands are subjected to coefficient smoothing process by using a Gaussian low-pass filtering method, wherein different levels of the high-frequency sub-bands adopt different Gaussian filter kernel parameters, and the Gaussian filter kernel parameters are: size W$^{(j)}$=(imgW/200)/2$^j$, sizeH$^{(j)}$=(imgH/200)/2$^j$, sigmaW$^{(j)}$=TW, sigmaH$^{(j)}$=TH, j=1 . . . J; imgW and imgH are a width and a height of the original image, sizeW$^{(j)}$ and sizeH$^{(j)}$ are width and height parameters of the Gaussian filter kernel corresponding to the j-th level wavelet sub-band, sigmaW$^{(j)}$ and sigmaH$^{(j)}$ are standard deviation parameters in the horizontal and vertical directions of the Gaussian filter kernel corresponding to the j-th level wavelet sub-band.

12. The background suppression method according to claim 11, wherein the Gaussian low-pass filtered image is $\tilde{F}_{k_1k_2}^{(j)}$, =$F_{k_1k_2}^{(j)}$, ** Gaussian$^{(j)}$, wherein $$Gaussian^{(j)} = \frac{1}{2\pi * sigmaW^{(j)} * sigmaH^{(j)}} e^{-\left(\frac{x^2}{2*(sigmaW(j))^2} + \frac{y^2}{2*(sigmaH(j))^2}\right)},$$

Gaussian$^{(j)}$ is a Gaussian low-pass filter corresponding to the j-th level wavelet sub-band, and ** is a filter convolution operation.

13. The background suppression method according to claim 1, wherein in the step S3, contrast enhancement process is performed on each level of the low-frequency sub-bands by using a histogram equalization method.

14. The background suppression method according to claim 13, wherein in the step S4, the defect image is:

$$f(x, y) = \frac{1}{\sqrt{MN}} \sum_m \sum_n \tilde{A}^{(j)}(j_0, m, n)\phi_{j_0,m,n}(x, y) + \frac{1}{\sqrt{MN}} \sum_{i=H,V,D} \sum_{j=j_0}^n \sum_m \sum_n \tilde{F}_\psi^i(j, m, n)\psi_{j,m,n}(x, y)$$

wherein $\tilde{A}^{(j)}$ is an image after the low-frequency sub-bands are enhanced, $\tilde{F}$ is an image after the high-frequency sub-band coefficient is suppressed, m and n are the width and height of the j-th level wavelet sub-band image.

* * * * *